(12) United States Patent
McGee et al.

(10) Patent No.: US 8,241,524 B2
(45) Date of Patent: Aug. 14, 2012

(54) RELEASE ON DEMAND CORROSION INHIBITOR COMPOSITION

(75) Inventors: John D. McGee, Troy, MI (US); Thomas S. Smith, II, Novi, MI (US); Brian D. Bammel, Rochester Hills, MI (US); Todd R. Bryden, Midland, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 452 days.

(21) Appl. No.: 12/467,537

(22) Filed: May 18, 2009

(65) Prior Publication Data

US 2010/0291307 A1   Nov. 18, 2010

(51) Int. Cl.
*C23F 11/00* (2006.01)
(52) U.S. Cl. .............. 252/389.54; 252/390; 524/548; 524/555; 524/406; 524/407; 524/408; 524/413
(58) Field of Classification Search ............ 524/406, 524/407, 408, 413, 548, 555; 252/390, 389.54
See application file for complete search history.

(56) References Cited

U.S. PATENT DOCUMENTS

| | | | |
|---|---|---|---|
| 6,165,969 A | 12/2000 | Bockh et al. | |
| 6,228,283 B1 | 5/2001 | Turcotte et al. | |
| 6,736,908 B2 | 5/2004 | Sako et al. | |
| 6,942,899 B2 | 9/2005 | Kendig et al. | |
| 2003/0063998 A1* | 4/2003 | Ghosh et al. | 422/16 |
| 2003/0063999 A1* | 4/2003 | Ghosh et al. | 422/16 |
| 2005/0163933 A1 | 7/2005 | Dietsche et al. | |
| 2005/0176851 A1 | 8/2005 | Cook | |
| 2006/0113509 A1 | 6/2006 | Norenberg et al. | |
| 2006/0162820 A1 | 7/2006 | Dietsche et al. | |
| 2007/0176149 A1 | 8/2007 | Dietsche et al. | |
| 2007/0240792 A1 | 10/2007 | Witteler et al. | |
| 2008/0171211 A1 | 7/2008 | Plieth et al. | |
| 2008/0216705 A1 | 9/2008 | Hayes et al. | |
| 2008/0260959 A1 | 10/2008 | Gonzalez et al. | |
| 2009/0078153 A1 | 3/2009 | Shchukin et al. | |

FOREIGN PATENT DOCUMENTS

WO   2006076457 A1   7/2006
WO   2009004684 A1   1/2009

OTHER PUBLICATIONS

International Search Report, dated Jan. 28, 2011, 3 pages for PCT/US2010/035087.

* cited by examiner

*Primary Examiner* — James J Seidleck
*Assistant Examiner* — Vu A Nguyen
(74) *Attorney, Agent, or Firm* — Mary K. Cameron

(57) ABSTRACT

Disclosed is a release on demand type corrosion inhibitor composition for a metal substrate formed from only non-electrically conductive film forming copolymer(s); a nitrogen containing functional group X, where the group X comprises a pyridine, a dihydropyridine, a pyrrole, an imidazole, or a mixtures thereof; and a metallate anion. The metallate anion binds to a nitrogen in the functional group X by ion pairing. A localized rise in pH is believed to cause release of the anion via a protonation/deprotonation reaction and the released anion suppresses the corrosion formation. The coating composition includes no electrically conductive polymers.

59 Claims, No Drawings

RELEASE ON DEMAND CORROSION INHIBITOR COMPOSITION

RELATED APPLICATIONS

NONE.

STATEMENT REGARDING FEDERALLY SPONSORED RESEARCH

NONE

TECHNICAL FIELD

This invention relates generally to anti-corrosion protective coatings and, more particularly, to anti-corrosion protective coatings comprising non-electrically conductive copolymers and functional groups comprising nitrogen heterocyclics coupled to metallate anions which are releasable in response to corrosion.

BACKGROUND OF THE INVENTION

Untreated metal surfaces are subject to corrosion which can lead to rust development, weakening, discoloration and failure of the surface. Thus metal substrates are typically treated by a variety of methods to make the surface less reactive and more corrosion resistant. In addition, metal surfaces are often subsequently coated with decorative or additional protective coatings such as resin coatings, primers, paints and other surface treatments.

One common mechanism of corrosion occurs galvanically when atmospheric oxygen oxidizes the metal of a metal substrate. The transfer of electrons from the metal to the oxygen at electrocatalytic sites leads to formation of various metal oxide corrosion products. A variety of treatments can be used to prevent corrosion of metal surfaces such as cold rolled steel, hot rolled steel, zinc, aluminum, and alloys thereof zinc- and zinc alloy-coated steel, as well as aluminum- and aluminum alloy-coated steel. These treatments include temporary oil-based rust preventatives, phosphate conversion coatings, inorganic and organic passivates, paints, and combinations thereof.

Temporary oil-based rust preventatives are used to provide short-term corrosion protection with ease of removal. They are not desirable for medium- or long-term corrosion protection alone, and when combined with other coatings make the surfaces unpaintable and by the nature of their handling are not suitable for a final consumer product.

Phosphate conversion coatings provide better corrosion protection and paintability, but require quite acidic conditions to operate, which is not desirable due to difficulty in handling the application chemicals, more troublesome waste treatment due to sludge generation, and extra wear on equipment. Such conversion coatings typically require subsequent treatments for maximum benefit.

Inorganic and organic passivates, such as those commonly applied to metal coil stock, provide high degrees of corrosion protection but possess several drawbacks. Many such products either contain chromium, are highly acidic, or both. Chrome is not desirable due to negative environmental considerations, toxicity, and more troublesome waste treatment. Highly acidic treatments are also prone to degrade processing equipment and pose concerns with worker exposure.

Another corrosion resistant coating approach has included the use of electrically conductive polymers, most commonly polyanilines (PANI), that conduct electrical currents without the addition of conductive inorganic substances. The conjugated double bonds in the polymers conduct electrons throughout the coating. Often, these electrically conductive polymer coatings may be doped with anions or they contain anions that release in response to a change in the electrical potential of the metal substrate. It has been suggested that the electrically conductive polymer acts as a cathode to supply sufficient current to form the protective barrier at the site of corrosion and simultaneously release anions which function as active inhibitors toward corrosion.

Electrically conductive polymers have found limited use within industrial coatings stemming from a number of drawbacks. In addition to having a high cost, the film formation properties of conductive polymers are not ideal and these polymers have limited solubility in organic solvents making application difficult. Consequently it is desirable to provide a mechanism for corrosion inhibition not reliant on use of conductive polymers. It is also desirable to provide a coating which responds to corrosion such that the means for inhibiting farther corrosive action is not depleted over time in the absence of significant corrosion. Coatings based solely on chrome have a number of undesirable attributes thus, it is desirable to provide coatings which are free of chrome which provide similar benefits against corrosion as chrome-based products. In other instances where chrome will continue to be used, it would be desirable to prolong the corrosion protection afforded by a chrome-containing coating composition. It would also be desirable to provide thin organic passivate compositions which are not acidic.

SUMMARY OF THE INVENTION

In general terms, this invention provides an anti-corrosion coating composition for a metal substrate that comprises only a non-electrically conductive film forming copolymer with no electrically conductive polymers or copolymers, a nitrogen containing functional group X and a metallate anion bonded to a nitrogen in the functional group X by ion pairing wherein the anion of the ion pair is releasable in response to corrosion thereby suppressing the corrosion.

More specifically, in one embodiment the present invention is an anti-corrosion coating composition for a metal substrate comprising only a non-electrically conductive film forming copolymer; a nitrogen containing functional group X, the group X comprising a pyridine, a dihydropyridine, a pyrrole, an imidazole, or mixtures thereof; and a metallate anion, wherein the metallate anion is capable of binding to a nitrogen in the functional group X by ion pairing through Coulomb attraction. The functional group X can be found bound to the copolymer, bound to and cross-linking copolymer chains, free in the coating composition as a separate component of the composition, or as any combination of two or more of these forms. The metallate anion can be provided as either an anionic metal containing species or as a non-anionic metal source that becomes anionic when used in the coating composition. In either case once the coating composition has been applied to a substrate and dried in place the metallate anion is bound to the functional group X by ion pairing. It can be demonstrated that the metallate anion will release from the nitrogen of functional group X once the pH rises above that associated with the pKa of the nitrogen group in functional group X. Upon release of the metallate anion a reduced rate of corrosion is observed. A number of mechanisms can be theorized to explain this effect. The inhibiting anion may oxidize preventing oxidation of the substrate, or it may form insoluble deposits which serve as a barrier at the point of corrosion or both. The functional group X's can be a pytidine, a dihydropyridine, a pyrrole, an imidazole, or mixtures thereof. The functional group X's can further be either substituted or unsubstituted.

These and other features and advantages of this invention will become more apparent to those skilled in the art from the detailed description of a preferred embodiment,

BRIEF DESCRIPTION OF THE DRAWINGS

NONE

DETAILED DESCRIPTION OF A PREFERRED EMBODIMENT

The present invention provides a high level of performance over bare metal surfaces meaning that the metal surface has not been pre-treated with any metal phosphate solutions, chrome-containing rinses, or any other passivating treatments, however the invention can also be used over conventional pretreatments. The invention is suitable for application to a variety of surfaces including steel, cold rolled steel, hot rolled steel, stainless steel, aluminum, however particular benefits are provided on steel coated with zinc or zinc alloys such as electrogalvanized steel, galvalume®, galvanneal, and hot-dipped galvanized steel.

In the present specification and claims when a range is provided for a component, temperature or other item it is intended that the range comprises all sub ranges found within the stated range.

Preferably, the metal surface is clean. In some applications such as a galvanizing line within a steel mill, the invention is applied in continuous fashion following the galvanizing step such that no separate cleaning operation is required. In other applications, a cleaning step prior to application of the invention is preferred. Cleaning of metal surfaces is well known in the art and can include mild or strongly alkaline cleaners. Examples of two alkaline cleaners include Parco® Cleaner ZX-1 and Parco® Cleaner 315 both available from Henkel Surface Technologies. Following cleaning the surface is preferably rinsed with water prior to treatment according to the present invention.

As discussed above, corrosion occurs when atmospheric oxygen is reduced at a location on the metal surface with a concomitant oxidation of metal from the substrate. The present invention is an anti-corrosion coating composition for a metal substrate that comprises only a non-electrically conductive film forming copolymer with no electrically conductive polymers, a nitrogen containing functional group X and a metallate anion bonded to a nitrogen in the functional group X by ion pairing. In the corrosion reaction the oxidation of the metal substrate is accompanied by a localized rise in pH at the corrosion site. It is theorized that the present invention functions by using this localized change in pH to trigger release of the metallate anion from the functional group X. The released anion is believed to, among other things, substitute for the metal in the reaction with oxygen thereby sparing the metal substrate and suppressing the corrosion.

The present invention utilizes non-electrically conductive film forming polymers as are known in the art. Exemplary classes of suitable non-electrically conductive film forming polymers include but are not limited to acrylics, polyurethanes and polyesters. One preferred class of non-electrically conductive film forming polymers are acrylic copolymers such as those made by emulsion polymerization in the form of a latex. Exemplary ethylenically unsaturated monomers used to prepare such copolymers include acrylic acid or esters thereof, methacrylic acid or esters thereof, styrene and vinyl functional compounds all of which are widely used in the art.

Functional group X may be imparted to an acrylic latex in a number of ways. A monomer bearing functional group X may be polymerized directly. Alternatively group X may result from a derivative reaction of a precursor functional group Z and the derivation can be carried out before, during, or after polymerization Functional group Z can be introduced as an endgroup on a polymerizable monomer, or it can be introduced as an endgroup or pendant group on an oligomer such as a hydrophobe within a mini-emulsion polymerization, or in the form of a small molecule additive. Alternatively, functional group X can be created as a small molecule, described more fully below in formulas I to IV, and this small molecule can be introduced into the coating composition. In some coating compositions functional group X can be found in any combination of two or more of the three forms in the coating composition. For example, a positive portion to 100% of functional group X can be bound to the copolymer chains, or a positive portion to 100% of functional group X can cross-link two copolymer chains, or a positive portion to 100% of functional group X can be free in the coating composition as a small molecule, or the coating composition can include any combination of two or more of theses forms.

In the present specification and claims functional group X as a small molecule means that the functional group X is in a form that is not bound to the non-electrically conductive film forming copolymer. It does not refer necessarily to its physical size as further described below. In a preferred embodiment functional group Z is a beta-ketoester group and X is a dihydropyridine group formed via the Hantzsch reaction. In the Hantzsch reaction 2 equivalents of beta-ketoester are reacted with one equivalent of ammonia and one equivalent of an aldehyde to form the dihydropyridine group. Within this preferred embodiment exemplary sources of Z include but are not limited to acetoacetoxyethyl methacrylate and acrylic copolymers made there from, ethylacetoacetate, t-butylacetoacetate, and acetoacetate functional polymers/oligomers such as K-Flex XM-B301 and K-Flex 7301 both from King Industries. The K-Flex polymers are low viscosity acetoacetate resins per the manufacturer. Within this preferred embodiment, any aldehyde conforming to the general structure L-CHO can be used wherein L is any substituent attached to the aldehyde function. Exemplary aldehydes include, by way of example only, formaldehyde, acetaldehyde, propionaldehyde, butyraldehyde, cinnamaldehyde, glucose, vanillin, glyoxalic acid and salicylaldehyde. Methods for formation of pyridine functional group X are well known in the art and include, by way of example only, polymerization of vinyl-pyridine or oxidationidehydrogenation of a dihydropyridine nctional group X.

In another preferred embodiment, Z is an acetoacetate group and functional group X is a pyrrole formed by reaction of a beta-ketoester group with an alpha-amino ketone via the Knorr pyrrole synthesis reaction. In another preferred embodiment Z is either a 1,4-dicarbonyl compound, or a primary amine and functional group X is a pyrrole formed via the Paal-Knorr Synthesis reaction. In another preferred embodiment Z is either a substituted 1,2-dicarbonyl compound, or a primary amine and functional group X is an imidazole formed by reaction of the 1,2-dicarbonyl compound with ammonia and aldehyde to form an unsubstituted imidazole or reaction of a 1,2 dicarbonyl compound with a primary amine and ammonia, which is an adaptation of the Debus-Radziszewski imidazole synthesis, to form a substituted imidazole. Particularly preferred embodiments are those in which a film forming non-conductive polymer comprising group Z is first prepared after which Z is converted to functional group X in a subsequent derivation reaction.

In one embodiment Z is an endgroup on a small molecule which upon undergoing the derivative reaction to form functional group X becomes less hydrophilic. During the derivative reaction, the small molecule bearing functional group X partitions by phase transfer into the organic phase of a latex or aqueous dispersion of the non-electrically conductive film forming polymer. Exemplary small molecules bearing Z are ethylacetoacetate and t-butylacetoacetate which can be converted to small molecule dihydropyridines as functional group X via the Hantzsch reaction using a latex or aqueous polymer dispersion as a reaction medium.

However incorporated into the coating composition, the functional group X is preferably present in an amount of from 0.001 to 0.5; more preferably from 0.005 to 0.20; and most preferably from an amount of from 0.01 to 0.05 moles of functional group X per kilogram of dried coating composition. The dried coating composition is achieved after the coating composition is applied to the metal substrate and dried in place. The functional group X ultimately binds the metallate anion via ion pairing. This binding may occur at the time of formation of the coating composition or after drying of the coating composition in place on the substrate. In one embodiment the metal substrate is coated with a solution containing the copolymer including the functional group X either bound to the copolymer, carried within an aqueous dispersion or emulsion of the film forming copolymer, or as a part of the solution. Then the coating composition is completed by immersing the substrate with copolymer and functional group X into an aqueous solution containing the metallate anion. The coating composition is then dried in place to form the final coated substrate. In another embodiment a phase stable mixture of the non-electrically conductive film forming copolymer, functional group X, either bound to the copolymer or free, and the metallate anion is created. The phase stable coating composition is then applied to the substrate and dried in place in a single operation.

A preferred formula for functional group X wherein it is a dihydropyridine is given below in formula (I) wherein, A and E are independently $C_1$ to $C_4$ alkyl groups; B and D are independently $COOR_1$, wherein $R_1$ is a linear or branched $C_1$ to $C_{12}$ hydrocarbon or a polymer chain; $F_1$ is Hydrogen; and $F_2$ is L, derived from an aldehyde L-CHO. The polymer chain can either be the non-electrically conductive film forming copolymer or any other polymer

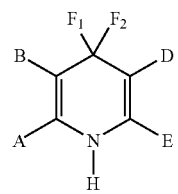

(I)

A preferred formula for a functional group X wherein it is a pyridine is given below in formula (II), wherein A and E are independently Hydrogen, $C_1$ to $C_4$ alkyl groups, or a polymer chain; B and D are independently Hydrogen or $COOR_1$, wherein $R_1$ is a linear or branched chain $C_1$ to $C_{12}$ hydrocarbon or a polymer chain; and $F_2$ is L, derived from an aldehyde L-CHO or a polymer chain. The polymer chain can either be the non-electrically conductive film forming copolymer or any other polymer.

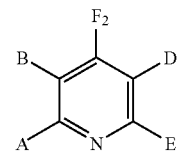

(II)

A preferred formula for a functional group X wherein it is a pyrrole is given below in formula (III), wherein I is Hydrogen, $R_1$ or $COOR_1$, where $R_1$ is a linear or branched $C_1$ to $C_{12}$ hydrocarbon or a polymer chain; J is a $C_1$ to $C_4$ alkyl group; K is Hydrogen or a polymer chain, F is Hydrogen, a $C_1$ to $C_{12}$ linear or branched hydrocarbon; and G is Hydrogen, a $C_1$ to $C_{12}$ linear or branched hydrocarbon or a polymer chain. The polymer chain can either be the non-electrically conductive film forming copolymer or any other polymer.

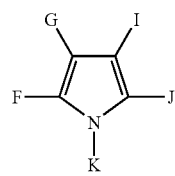

(III)

A preferred formula for a functional group X wherein it is an imidazole is given below in formula (IV), wherein I is a polymer chain, Hydrogen or a $C_1$ to $C_{12}$ linear or branched hydrocarbon; J is Hydrogen or L derived from an aldehyde L-CHO, F and G are independently Hydrogen or a $C_1$ to $C_{12}$ linear or branched hydrocarbon. The polymer chain can either be the non-electrically conductive film forming copolymer or any other polymer.

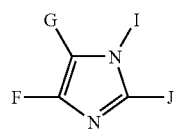

(IV)

Methods for applying the dry in place coating compositions of the present invention are known in the art and include dry in place coating methods, spray application, roll coating, dip or bath coating, drawbar coating and other processes known to those of skill in the art. Drying may be achieved under any number of conditions, however application of heat is generally preferred. In a preferred embodiment application is made by roll coating. The coating compositions of the present invention are preferably applied at a level of from 75 to 600 milligrams per square foot; more preferably at a level of from 100 to 400 milligrams per square foot; and most preferably at a level of from 120 to 200 milligrams per square foot. The applied coatings are preferably dried using a peak metal temperature of from 43° C. to 150° C.; more preferably from 70° C. to 130° C.; and most preferably from 90° C. to 110° C.

The metallate anions that find use in the present invention include metallates of molybdenum, tungsten, vanadium, zirconium, chromium or mixtures thereof. Non-limiting exemplary sources for the metallate anions include ammonium heptamolybdate, tungstic acid and its salts, vanadium pentoxide, ammonium vanadate, vanadyl sulfate, fluorozirconic acid and its salts, chromium trioxide or mixtures thereof. The metallate anions are preferably present in the coating composition in an amount of from 0.001 to 1.500; more preferably in an amount of from 0.01 to 1.25; and most preferably in an amount of from 0.1 to 1.0 moles of metal element per kilogram dried coating composition.

As noted above the metallate anion is ion pair bonded to the functional group X at a nitrogen in the functional group X within the applied coating composition. For ion pairing to occur, the nitrogen must be in cationic form. Any number of acid sources can be utilized to provide a cation of functional group X. Exemplary proton sources are polymeric acid sources such as polymers with carboxyl functionality or phosphorus-based or sulfur-based acids groups. Such acid functional groups can be imparted to a polymer by ways known in the art. Acid groups can be imparted to the polymer by acid functional monomers such as acrylic acid, methacrylic acid, phosphorus-based acid monomers such as Polysurf HP, Ebecryl 168 or Ebecryl 170 and sulfur-based acid monomers such as sulfoethylmethacrylate. Polysurf HP is a mixture of polymerizable propenoic acid phosphonyoxy esters per the manufacturer ADD APT Chemicals BV, The Ebecryl 168 and 170 are available from Cytec Industries and are methacrylated acidic derivatives. In other cases, acidic endgroups associated with many conventional acrylic initiators such as ammonium persulfate may be sufficient to provide a proton for X. Alternatively, non-polymeric acid sources may be used. In a preferred embodiment, the coating composition prior to application and drying comprises a volatile base such as ammonia such that ion pairing of the nitrogen of functional group X to the metallate anion can be delayed until the time of application of the coating composition. After ion pairing has occurred, it is theorized that the increase in localized pH accompanying corrosion leads to release of the anion from the nitrogen of the functional group X. The release behavior of the nitrogen of the functional group X is governed by the pKa of the nitrogen of functional group X. Preferred functional groups constituting X may vary significantly in pKa however in preferred embodiments pKa generally falls between 4 and 11 and all ranges between.

Coating compositions of the present invention may also comprise other optional components such as crosslinkers, pH modifiers, other non-electrically conductive polymeric film formers, or coating additives. In a preferred embodiment, an aqueous coating composition prior to application has a pH between 8 and 11, preferably around pH 10 wherein ammonia is used as a pH modifier and ammonium zirconium carbonate is utilized as a crosslinker. Additives can include wetting agents, slip aids, reducing agents, coalescing aids or other commonplace additives for coatings.

The present invention will now be illustrated in a series of examples. The examples are illustrative of the invention and not intended to limit the invention or its embodiments. A first latex non-electrically conducting film forming copolymer, Example 1, was formed as detailed below in Table 1.

TABLE 1

| Part | Component | Wt added |
|------|-----------|----------|
| A | Deionized water | 245.3 |
|   | Rhodapon L22 | 1.7 |
| B1 | Deionized water | 76.1 |
|    | Rhodapon L22 | 1.7 |
|    | Tergital 15-S-20 | 11.9 |
| B2 | n-butyl methacrylate | 45.7 |
|    | Styrene | 34.3 |

TABLE 1-continued

| Part | Component | Wt added |
|------|-----------|----------|
|   | Methyl methacrylate | 67.4 |
|   | 2-ethylhexyl acrylate | 46.8 |
|   | Acetoacetoxyethyl Methacrylate | 22.9 |
|   | Polysurf HP | 11.4 |
| C | Ammonium persulfate | 0.60 |
|   | Deionized water | 11.4 |
| D | 70% t-butylhydroperoxide | 0.31 |
|   | Deionized water | 9.7 |
| E | Ascorbic acid | 0.17 |
|   | Deionized water | 9.8 |
| F | 0.5% aqueous ferrous sulfate | 1.8 |
| G | Ammonium hydroxide 28.8% | 4.6 |
|   | Deionized water | 10.5 |
| H | Deionized water | 14.4 |

Part A was added to a four-necked 1 liter (L) flask equipped with a stirrer, condenser, thermocouple and nitrogen inlet. Rhodapon L22 is an anionic surfactant of ammonium lauryl sulfate available from Rhodia. It was heated to and maintained at 80° C. under a nitrogen atmosphere. Parts B1 and B2 were mixed separately to form uniform clear solutions. Tergital 15-S-20 is a non-ionic surfactant of secondary alcohol ethoxylate available from Dow Chemical, Polysurf HP is a surfactant that is a mix of polymerizable propenoic acid phosphonyoxy esters and is available from ADD APT Chemicals BV. B 1 and B2 were mixed together to form pre-emulsion B. An amount of 5% of the pre-emulsion B and 25% of part C were charged to the flask and maintained at 80° C. After 15 minutes the remainder of pre-emulsion B and part C were added at a constant rate to the flask over a period of 3 hours after which part H was used to flush the pre-emulsion addition pump into the flask. The flask contents were then cooled to 70° C. at which time part F was added to the flask. Then parts D and E were added to the flask over a period of 30 minutes, after which the mixture was maintained at 70° C. for a period of 1 hour. The mixture was cooled to 40° C. at which time part G was added. The resulting latex, Example 1, had a solids content of 37.2%, a pH of 7.1, and particle size of 132 nanometers.

A series of latex non-electrically conducting film forming copolymers, Examples 2A to 2D, having dihydropyridine functional groups X were prepared via the Hantzsch reaction using the latex of Example 1 as detailed in Table 2 below. The selected aldehydes were added in the weight ratios designated and the mixtures were placed in sealed containers in an oven set at 45° C. for 24 hours.

TABLE 2

| Component | 2A | 2B | 2C | 2D |
|-----------|-----|-----|-----|-----|
| Latex Example 1 | 100 | 100 | 100 | 100 |
| 37% formaldehyde | 0.18 | 0.36 | | |
| propionaldehyde | | | 0.13 | 0.27 |

Using the film forming copolymers with dihydropyridine functional group X prepared in Examples 2A to 2D and the copolymer Example 1 a series of aqueous coating compositions, Examples 3A to 3E, were prepared using vanadium pentoxide as the metallate anion source as detailed below in Table 3. Bacote 20 is an aqueous alkaline stabilized solution of ammonium zirconium carbonate containing anionic hydroxylated zirconium polymers. It is available from Magnesium Elektron, Inc. and it provides approximately 20% wgt/wgt of $ZrO_2$. The components were mixed together in the order listed. In these examples the dihydropyridine functional groups are found both on the film forming copolymers as pendant groups and in crosslinking bridges that crosslink the copolymers. Comparative 3A has no dihydropyridine functional group X and serves as a control composition.

TABLE 3

| Component | Comparative 3A | 3B | 3C | 3D | 3E |
|---|---|---|---|---|---|
| Deionized water | 62.9 | 63.05 | 63.0 | 63.0 | 63.0 |
| Bacote 20 | 24.0 | 24.0 | 24.0 | 24.0 | 24.0 |
| Vanadium pentoxide | 0.5 | 0.5 | 0.5 | 0.5 | 0.5 |
| Latex Example 1 | 12.1 | | | | |
| Latex Example 2A | | 11.95 | | | |
| Latex Example 2B | | | 12.0 | | |
| Latex Example 2C | | | | 12.0 | |
| Latex Example 2D | | | | | 12.0 |
| Ascorbic acid | 0.5 | 0.5 | 0.5 | 0.5 | 0.5 |

Each coating composition 3A to 3E was applied to clean hot-dipped galvanized substrates by a drawbar as known in the art and dried by heating to a peak metal temperature of 93° C. and a dry coating weight of 175±25 mg/ft².

COMPARATIVE EXAMPLE 4

As a comparison clean hot-dipped galvanized panels were coated with P3000B a commercial chrome-based thin-organic passivate available from Henkel Corporation. The P3000B was applied to the panels by drawbar and dried by heating to a peak metal temperature of 93° C. yielding a dry coating weight of 175±25 mg/ft².

Panels coated with coating compositions Examples 3A to 3E and Comparative Example 4 were placed in a Neutral Salt Spray (NSS) cabinet and corrosion tested per ASTM B117. Corrosion was measured as a % of total facerust as a function of time. The % corrosion was determined from the average of 3 test panels for each coating composition. The results of the tests after 336 and 504 hours of NSS are reported below in Table 4.

TABLE 4

| Formulation | % Facerust after 336 hours | % Facerust after 504 hours |
|---|---|---|
| Example 3A | 13.0 | 29.0 |
| Example 3B | 3.0 | 5.3 |
| Example 3C | 2.3 | 12.3 |
| Example 3D | 1.7 | 4.3 |
| Example 3E | 1.7 | 13.3 |
| Comparative Example 4 | 1.0 | 8.0 |

The results in Table 4 illustrate the benefits of the coating composition prepared according to the present invention. The results from the coating composition without the addition of the functional group X, in these examples dihydropdine, Example 3A, versus with dihydropyridine, Examples 38 to 3E, show that the functional group X is necessary for the enhanced corrosion protection. Compared to the P3000B chrome-based coating of Comparative Example 4 the coating compositions prepared according to the present invention faired very well and in some cases exceeded the protection offered by this chrome-based coating. The vanadium-based inhibiting anion alone was not able to provide significant protection on its own.

Another latex non-electrically conducting film forming copolymer, latex Example 6, was prepared as described below using the components of Table 5

TABLE 5

| Part | Material | Wt added |
|---|---|---|
| A | Deionized water | 245.3 |
| | Rhodapon L22 | 1.7 |
| B1 | Deionized water | 76.1 |
| | Rhodapon L22 | 1.7 |
| | Tergital 15-S-20 | 11.9 |
| B2 | n-butyl methacrylate | 28.6 |
| | Styrene | 34.1 |
| | Methyl methacrylate | 62.9 |
| | 2-ethylhexyl acrylate | 46.2 |
| | Acetoacetoxyethyl Methacrylate | 45.3 |
| | Polysurf HP | 11.3 |
| C | Ammonium persulfate | 0.60 |
| | Deionized water | 11.4 |
| D | 70% t-butylhydroperoxide | 0.31 |
| | Deionized water | 9.7 |
| E | Ascorbic acid | 0.17 |
| | Deionized water | 9.8 |
| F | 0.5% aqueous ferrous sulfate | 1.8 |
| G | Ammonium hydroxide 28.8% | 4.3 |
| | Deionized water | 10.5 |
| H | Deionized water | 14.4 |

Part A was added to a four-necked 1 L flask equipped with a stirrer, condenser, thermocouple and nitrogen inlet. The contents were heated to and maintained at 80° C. under nitrogen atmosphere. Parts B1 and B2 were mixed separately to form uniform clear solutions. Then parts B1 and B2 were mixed together to form pre-emulsion B, An amount of 5% of pre-emulsion B and 25% of part C was charged to the flask and maintained at 80° C. After 40 minutes the remainder of pre-emulsion B and part C were added at a constant rate to the flask over a period of 3 hours after which part H was used to flush the pre-emulsion addition pump into the flask. The flask contents were cooled to 70° C. at which time part F was added to the flask. Parts D and E were added to the flask over a period of 30 minutes, after which the mixture was maintained at 70° C. for a period of 1 hour. The mixture was cooled to 40° C. at which time part G was added. The resulting latex had a solids content of 37.2%, a pH of 6.9, and particle size of 123 nanometers.

Another latex non-electrically conducting film forming copolymer, latex Example 7, was prepared as described below using the components of Table 6.

TABLE 6

| Part | Material | Wt added |
|---|---|---|
| A | Deionized water | 231.0 |
| | Rhodapon L22 | 1.6 |
| B1 | Deionized water | 71.6 |
| | Rhodapon L22 | 2.0 |
| | Tergital 15-S-20 | 13.4 |
| B2 | n-butyl methacrylate | 26.9 |
| | Styrene | 32.1 |
| | Methyl methacrylate | 59.2 |
| | 2-ethylhexyl acrylate | 43.5 |
| | Acetoacetoxyethyl Methacrylate | 42.6 |
| | Polysurf HP | 10.6 |
| | t-butyl acetoacetate | 39.3 |
| C | Ammonium persulfate | 0.55 |
| | Deionized water | 11.4 |
| D | 70% t-butylhydroperoxide | 0.29 |
| | Deionized water | 9.7 |

TABLE 6-continued

| Part | Material | Wt added |
|---|---|---|
| E | Ascorbic acid | 0.16 |
|  | Deionized water | 9.8 |
| F | 0.5% aqueous ferrous sulfate | 1.7 |
| G | Ammonium hydroxide 28.8% | 4.1 |
|  | Deionized water | 10.0 |
| H | Deionized water | 35.0 |

Part A was added to a four-necked 1 L flask equipped with a stirrer, condenser, thermocouple and nitrogen inlet. The contents were heated to and maintained at 80° C. under nitrogen atmosphere. Parts B1 and B2 were mixed separately to form uniform clear solutions. Then parts B1 and B2 were mixed to form pre-emulsion B. An amount of 5% of pre-emulsion B and 25% of part C was charged to the flask and maintained at 80° C. After 40 minutes the remainder of pre-emulsion B and part C were added at a constant rate to the flask over a period of 3 hours after which pan H was used to flush the pre-emulsion addition pump into the flask. Flask contents were cooled to 70° C. at which time part F was added to the flask. Parts D and E were added to the flask over a period of 30 minutes, after which the mixture was maintained at 70° C. for a period of 1 hour. The mixture was cooled to 35° C. at which time part G was added. The resulting latex had a solids content of 34.5%, a pH of 6.8, and particle size of 116 nanometers.

Another latex non-electrically conducting film forming copolymer, latex Example 8, was prepared as described below using the components of Table 7.

TABLE 7

| Part | Material | Wt added |
|---|---|---|
| A | Deionized water | 100 |
|  | Rhodapon L22 | 1.6 |
| B1 | Deionized water | 371.6 |
|  | Rhodapon L22 | 3.2 |
|  | Tergital 15-S-20 | 11.2 |
| B2 | n-butyl methacrylate | 26.9 |
|  | Styrene | 32.1 |
|  | Methyl methacrylate | 59.2 |
|  | 2-ethylhexyl acrylate | 43.5 |
|  | Acetoacetoxyethyl Methacrylate | 42.6 |
|  | Polysurf HP | 10.6 |
|  | KFlex XM-301 | 37.8 |
|  | t-butyl acetoacetate | 39.3 |
| C | Ammonium persulfate | 0.55 |
|  | Deionized water | 11.4 |
| D | 70% t-butylhydroperoxide | 0.29 |
|  | Deionized water | 9.7 |
| E | Ascorbic acid | 0.16 |
|  | Deionized water | 9.8 |
| F | 0.5% aqueous ferrous sulfate | 1.8 |
| G | Ammonium hydroxide 28.8% | 4.0 |
|  | Deionized water | 10.0 |
| H | Deionized water | 15.0 |

Part A was added to a four-necked 1 L flask equipped with a stirrers condenser, thermocouple and nitrogen inlet. The contents were heated to and maintained at 80° C. under nitrogen atmosphere. Parts B1 and B2 were mixed separately to form uniform clear solutions. Parts B1 and B2 were combined with mixing and passed through a microfluidizer 3 times with an applied pressure of 9000 P.S.I. yielding pre-emulsion B. An amount of 5% of pre-emulsion B and 25% of part C was charged to the flask and maintained at 80° C. After 20 minutes the remainder of pre-emulsion B and part C were added at a constant rate to the flask over a period of 3 hours after which part H was used to flush the pre-emulsion addition pump into the flask. The flask contents were cooled to 70° C. at which time part F was added to the flask. Parts D and E were added to the flask over a period of 30 minutes, after which the mixture was maintained at 70° C. for a period of 1 hour. The mixture was cooled to 44° C. at which time part G was added. The resulting latex had a solids content of 29.6%, a pH of 6.8, and particle size of 165 nanometers.

A series of non-electrically conducting film forming copolymers with functional group X provided by a dihydropyridine functional group were prepared by adding aldehydes to latexes 6 to 8 in the weight ratios shown in Table 8 below. Each mixture was mixed placed in a sealed container and placed in an oven at 45° C. for a period of 24 hours. In example 9A the dihydropyridine functional groups are found both on the film forming copolymers as pendant groups and in crosslinking bridges that crosslink the copolymers. In examples 9B and 9C the dihydropyridine functional groups are found on the film forming copolymers as pendant groups, in crosslinking bridges that crosslink the copolymers, and as small molecules, that is free in the coating composition not bound to the copolymers.

TABLE 8

| Material | 9A | 9B | 9C |
|---|---|---|---|
| Latex Example 6 | 100.0 |  |  |
| Latex Example 7 |  | 200.0 |  |
| Latex Example 8 |  |  | 200 |
| 37% formaldehyde | 0.4 | 2.2 | 1.56 |
| Ammonium hydroxide 28.8% | 0.37 | 1.6 | 1.2 |
| Deionized water | 10.0 | 10.0 | 8.0 |

A series of aqueous coating compositions, Examples 10A to 10D, were prepared according to the present invention by combining in the order listed the components in Table 9 with mixing.

TABLE 9

| Material | 10A | 10B | 10C | 10D |
|---|---|---|---|---|
| Deionized water | 61.1 | 53.1 | 53.1 | 58.6 |
| Bacote 20 | 24.0 | 32.0 | 32.0 | 24.0 |
| Vanadium pentoxide | 1.0 | 1.0 | 1.0 | 1.0 |
| Latex example 9A | 13.4 | 13.4 |  |  |
| Latex example 9B |  |  | 13.4 |  |
| Latex example 9C |  |  |  | 15.9 |
| Ascorbic acid | 0.5 | 0.5 | 0.5 | 0.5 |

Each coating composition, Examples 10A to 10D, was applied to clean hot-dipped galvanized substrate by drawbar and dried by heating to a peak metal temperature of 93° C. and a dry coating weight of 175±25 mg/ft$^2$.

A series of the coated panels from Examples 10A to 10D and Comparative Example 4 were placed in a Neutral Salt Spray cabinet and tested as detailed above. Corrosion was measured as a % of total facerust as a function of time for a plurality of panels and averaged. The results are reported below in Table 10.

TABLE 10

| Formulation | % Facerust after 504 hours | % Facerust after 840 hours |
|---|---|---|
| Example 10A | 7.0 | 100 |
| Example 10B | 7.0 | 30.0 |

TABLE 10-continued

| Formulation | % Facerust after 504 hours | % Facerust after 840 hours |
|---|---|---|
| Example 10C | 3.0 | 30.0 |
| Example 10D | 20.0 | 100 |
| Comparative Example 4 | 7.0 | 100.0 |

The results demonstrate that chrome-free coating compositions according to the present invention can provide corrosion resistance equivalent to or better than a commercial chrome-based product.

In another example a commercially available non-electrically conducting film forming copolymer was used in the present invention. In Comparative Example 11A Carboset CR-760 commercially available from Lubrizol was utilized as the copolymer alone with no functional group X. Carboset CR-760 is a thermoplastic styrene-acrylic copolymer emulsion having a total solids by weight of approximately 42.0% per the manufacturer. In Example 12 the Carboset CR-760 was used as the copolymer and dihydropyridine functional group X was added to it as described below in Table 11.

TABLE 11

| Part | Material | Wt added |
|---|---|---|
| A | Carboset CR-760 | 126.3 |
| B | Deionized water | 19.4 |
|   | Rhodapon L22 | 0.16 |
|   | Tergital 15-S-20 | 0.54 |
| C | Deionized water | 19.4 |
|   | Ammonium hydroxide (28.8%) | 0.7 |
| D | Ethyl acetoacetate | 1.77 |
| E | 37% formaldehyde | 0.61 |

A dihydropryidine containing latex, Example 12, was prepared by direct phase transfer. In this example the dihydropyridine functional group is a small molecule, namely it is not bound to a copolymer the functional group is free in the latex. Here the latex is being used as the reaction medium. Part A was added to a closed three-necked ½ L flask equipped with a stirrer, condenser, and thermocouple. Parts B and C were mixed separately to form uniform clear solutions then added to the flask. Part D was added drop wise to the flask after which part E was added. After 1 hour mixing at room temperature, the mixture was heated to and maintained at 50° C. for two hours. The resulting latex was filtered yielding a latex with a solids content of 31.4%, a pH of 8.3, and particle size of 94 nanometers.

In another example a commercially available non-electrically conducting film forming copolymer was used in the present invention. In Comparative Example 11B Avanse MV-100, an acrylic polymer commercially available from Rohm and Hass, was utilized alone with no functional group X added. In Example 13 the Avanse MV-100 was used as the copolymer and a dihydropyridine functional group X was added to it as described below in Table 12. In this example the dihydropyridine functional group is a small molecule, namely it is not bound to a copolymer the functional group is free in the latex. Here the latex is being used as the reaction medium.

TABLE 12

| Part | Material | Wt added |
|---|---|---|
| A | Avanse MV-100 | 199.2 |
| B | Deionized water | 36.6 |
|   | Rhodapon L22 | 0.30 |
|   | Tergital 15-S-20 | 1.0 |
| C | Deionized water | 36.6 |
|   | Ammonium hydroxide (28.8%) | 1.30 |
| D | Ethyl acetoacetate | 3.34 |
| E | 37% formaldehyde | 1.15 |

A dihydropyridine containing latex, Example 13, was prepared by direct phase transfer. Part A was added to a closed three-necked ½ L flask equipped with a stirrer, condenser, and thermocouple. Parts B and C were mixed separately to form uniform clear solutions then added to the flask. Part D was added drop wise to the flask after which part E was added. After 20 minutes mixing at room temperature, the mixture was heated to and maintained at 50° C. for 3 hours followed by an additional 6 hours at 40° C. The resulting latex was filtered yielding a latex with solids content of 37.5%, a pH of 9.0, and particle size of 129 nanometers.

A series of aqueous coating compositions were prepared by combining in the order listed with mixing the components from Table 13 below.

TABLE 13

| Material | Comparative 14A | 14B | Comparative 14C | 14D |
|---|---|---|---|---|
| Deionized water | 64.3 | 60.7 | 66.1 | |
| Bacote 20 | 24.0 | 24.0 | 24.0 | 24.0 |
| Vanadium pentoxide | 0.5 | 0.5 | 0.5 | 0.5 |
| Comparative Latex example 11A | 10.7 | | | |
| Latex example 12 | | 14.3 | | |
| Comparative Latex example 11B | | | 8.9 | |
| Latex Example 13 | | | | 12.0 |
| cysteine | 0.5 | 0.5 | 0.5 | 0.5 |

Each coating composition, Comparative 14A, 14B, Comparative 14C and 14D was applied to a plurality of clean hot-dipped galvanized substrates by the drawbar method and dried by heating to a peak metal temperature of 93° C. and a dry coating weight of 175±25 mg/ft².

The coated panels using Examples Comparative 14A, 14B, Comparative 14C and 14D were placed in a Neutral Salt Spray cabinet and tested as described above. Corrosion was measured as a % of total facerust as a function of time and the results reported below in Table 14 are the average of multiple panels of each condition.

TABLE 14

| Formulation | % Facerust after 168 hours | % Facerust after 336 hours | % Facerust after 504 hours |
|---|---|---|---|
| Comparative Example 14A | 0% | 6.7% | 26.7% |
| Example 14B | 0% | 1.0% | 3.0% |
| Comparative Example 14C | 30% | 50% | 100% |
| Example 14D | 3% | 23.3% | 50% |

The results reported in Table 14 again demonstrate the benefit of the present invention as an anti-corrosion treatment. The results show the anti-corrosive effect of a vanadium-based inhibiting anion in conjunction with a dihydropyrine binding site introduced into two commercial latexes of non-electrically conducting film forming copolymers by direct phase transfer.

In another examples Example 16, a non-electrically conducting film forming copolymer was created. The copolymer was created with pyridine as the functional group X in the coating composition. The copolymer with pyridine functional group X was prepared as described below in Table is. In this example the pyridine functional group is found bound to the copolymer.

TABLE 15

| Part | Material | Wt added |
|---|---|---|
| A | Deionized water | 202.3 |
|  | Rhodapon L22 | 1.7 |
| B1 | Deionized water | 76.1 |
|  | Rhodapon L22 | 1.7 |
|  | Tergital 15-S-20 | 11.9 |
| B2 | n-butyl methacrylate | 30.9 |
|  | Styrene | 31.1 |
|  | Methyl methacrylate | 62.9 |
|  | 2-ethylhexyl acrylate | 46.2 |
|  | Acetoacetoxyethyl Methacrylate | 45.3 |
|  | 4-vinyl pyridine | 12.1 |
| C | Ammonium persulfate | 0.60 |
|  | Deionized water | 11.4 |
| D | Ammonium carbonate | 0.4 |
|  | Deionized water | 11.6 |
| E | 70% t-butylhydroperoxide | 0.31 |
|  | Deionized water | 9.7 |
| F | Ascorbic acid | 0.17 |
|  | Deionized water | 9.8 |
| G | 0.5% aqueous ferrous sulfate | 1.8 |
| H | Ammonium carbonate | 0.1 |
|  | Deionized water | 9.9 |
| I | Ammonium hydroxide 28.8% | 0.6 |
|  | Deionized water | 10.5 |
| J | Deionized water | 14.4 |

Part A was added to a four-necked 1 L flask equipped with a stirrer, condenser, thermocouple and nitrogen inlet. The contents were heated to and maintained at 80° C. under nitrogen atmosphere. Parts B1 and B2 were mixed separately to form uniform clear solutions. Then parts B1 and B2 were mixed to form pre-emulsion B. An amount of 5% of pre-emulsion B, 25% of part C and 25% of part D was charged to the flask and maintained at 80° C. After 20 minutes the remainders of pre-emulsion B, part C, and part D were added at a constant rate to the flask over a period of 3 hours after which. Part J was used to flush the pre-emulsion addition pump into the flask. The flask contents were cooled to 70° C. at which time part G was added to the flask. Parts E, F, and H were added to the flask over a period of 30 minutes, after which the mixture was maintained at 70° C. for a period of 1 hour. The mixture was cooled to 40° C. at which time part I was added. The resulting latex, Example 16, had a solids content of 39.6%, a pH of 6.5, and particle size of 114 nanometers.

A series of aqueous coating compositions, Examples 17A to 17C, were created using latex Example 6 with no functional group X in combination with Example 16 having pyridine functional group X added. The coating compositions were prepared by combining in the order listed below in Table 16.

TABLE 16

| Material | 17A | 17B | 17C |
|---|---|---|---|
| Deionized water | 62.9 | 63.0 | 63.1 |
| Bacote 20 | 24.0 | 24.0 | 24.0 |
| Vanadium pentoxide | 0.5 | 0.5 | 0.5 |

TABLE 16-continued

| Material | 17A | 17B | 17C |
|---|---|---|---|
| Latex Example 6 | 12.1 | 10.5 | 9.0 |
| Latex Example 16 | 0 | 1.5 | 2.9 |
| Ascorbic acid | 0.5 | 0.5 | 0.5 |

Each composition, Examples 17A to 17C, was applied to a plurality of clean hot-dipped galvanized substrates by drawbar and dried by heating to a peak metal temperature of 93° C. and a dry coating weight of 175±25 mg/ft$^2$. Coated panels coated with Examples 17A to 17C and Comparative Example 4, described above, were placed in a Neutral Salt Spray cabinet and tested as described above. The extent of corrosion was measured as a % of total facerust as a function of time and plurality of panels under each condition and time point were averaged to generate the results shown in Table 17 below.

TABLE 17

| Formulation | % Facerust after 168 hours | % Facerust after 336 hours |
|---|---|---|
| Example 17A | 6.0% | 20.7% |
| Example 17B | 1.0% | 6.3% |
| Example 17C | 1.7% | 12.3% |
| Comparative Example 4 | 1.0% | 5.7% |

The results shown in Table 17 show the benefit of the present invention when the functional group X is a pyridine. The anti-corrosion effect is nearly as great as the commercially available chrome-based solution in Comparative example 4.

In another example, Example 18, a non-electrically conducting film forming copolymer was created. The copolymer latex example 18 was created with dihydropyridine as the functional group X in the coating composition. The copolymer with dihydropyridine as the functional group X was prepared as described below in Table 18. In this example the dihydropyridine functional group X is found crosslinking copolymer chains.

TABLE 18

| Part | Material | Wt added |
|---|---|---|
| A1 | Deionized water | 964.4 |
|  | Rhodapon L22 | 10.5 |
| A2 | 0.5% aqueous ferrous sulfate | 9.6 |
| B1 | Deionized water | 458.4 |
|  | Rhodapon L22 | 10.5 |
|  | Tergital 15-S-20 | 72.0 |
| B2 | n-butyl methacrylate | 172.0 |
|  | Styrene | 205.6 |
|  | Methyl methacrylate | 378.8 |
|  | 2-ethylhexyl acrylate | 278.4 |
|  | Acetoacetoxyethyl methacrylate | 272.8 |
|  | Polysurf HP | 68.2 |
| C1 | 70% t-butylhydroperoxide | 7.4 |
|  | Deionized water | 33.0 |
| C2 | Sodium formaldehyde sulfoxylate | 5.2 |
|  | Deionized water | 35.2 |
| D1 | 70% t-butylhydroperoxide | 1.8 |
|  | Deionized water | 18.2 |
| D2 | Sodium formaldehyde sulfoxylate | 1.3 |
|  | Deionized water | 18.7 |
| E | Deionized water | 60.0 |
| F | Ammonium hydroxide 28.8% | 24.8 |
|  | Deionized water | 73.9 |

Part A1 was added to a four-necked 5 L flask equipped with a stirrer, condenser, thermocouple and nitrogen inlet. The contents were heated to and maintained at 70° C. under a nitrogen atmosphere at which time A2 was added. Parts B1, B2, C1 and C2 were mixed separately to form uniform clear solutions. Then B1 and B2 were mixed together to form pre-emulsion B. An amount of 5% of the pre-emulsion B and 25% of parts C1 and C2 were charged to the flask and maintained at 70° C. After 15 minutes the remainders of pre-emulsion B and parts C1 and C2 were added at a constant rate to the flask over a period of 3 hours, after which part E was used to flush the pre-emulsion addition pump into the flask. Parts D1 and D2 were mixed separately to form clear solutions and then added at a constant rate over a period of 30 minutes. The mixture was maintained at 70° C. for a period of 1 hour. The flask contents were cooled to 50° C. at which time part F was mixed then it was added to the flask. The latex had a solids content of 45%, a particle size of 94 nanometers and a pH of 6.6.

A chrome VI containing coating composition, Example 19A, was prepared by mixing the components in the order listed in Table 19 below. A chrome III containing coating composition, Example 19B, was prepared by mixing the components in the order listed in Table 19 below.

TABLE 19

| Material | 19A | 19B |
| --- | --- | --- |
| Deionized water | 41.45 | 40.7 |
| Bacote 20 | 28.15 | 28.15 |
| $CrO_3$ | 0.55 | 0.55 |
| Example 18 | 29.85 | 29.85 |
| Ascorbic acid | 0.00 | 0.75 |

Each coating composition, Examples 19A and 19B, was applied to a plurality of clean hot-dipped galvanized substrates by drawbar and dried by heating to a peak metal temperature of 93° C. and a dry coating weight of 175±25 mg/ft$^2$. Coated panels coated with Examples 19A and 19B and Comparative Example 4, described above, were placed in a Neutral Salt Spray cabinet and tested as described above. The extent of corrosion was measured as a % of total facerust as a function of time and three panels under each condition and time point were averaged to generate the results shown in Table 20 below.

TABLE 20

| Formulation | % Facerust after 504 hours | % Facerust after 672 hours |
| --- | --- | --- |
| Example 19A | 0.0 | 0.3 |
| Example 19B | 0.0 | 0.3 |
| Comparative example 4 | 11.0 | 19 |

The results shown in Table 20 show the dramatic benefit of the present invention when the functional group X, in this case a dihydropyridine, is coupled to chrome as the metallate anion source. The results show that the present invention is significantly better at preventing corrosion than a commercially available conventional chrome treatment. The benefit of the present invention is expected to extend to well beyond 672 hours of NSS testing.

To show the lack of electrical conductivity of copolymers prepared according to the present invention versus a typical electrically conductive copolymer an electrically conductive coating was prepared using electrically conductive copolymer Example 20. To form the conductive copolymer, Example 20, 10 parts of n-methylpyrrolidone were combined with 1.1 parts Panipol F, an acid doped emeraldine form of polyaniline. The materials were mixed with heating to form a liquid coating composition which was applied to clean hot-dipped galvanized substrate by drawbar and dried by heating for 10 minutes at a temperature of 185° C. Dry coating weight was measured to be 206 mg/f$^2$. Resistivity of the applied coatings was measured using a Loresta-EP resistivity meter equipped with a Loresta probe 8000-20-01. 12 replicate measurements were made for each panel and averaged. Similar measurements were taken of panels coated as described above with Examples 3B to 3E which include dihydropyridine functional group X and vanadium pentaoxide as the metallate anion. The results are shown below in Table 21. The results demonstrate that the non-electrically conductive copolymers of the invention provide coatings which are insulators as compared to conductive coatings based on inherently conductive polymers such as Example 20.

TABLE 21

| Coated Panel | Coating Weight mg/ft$^2$ | Resistivity (ohms) | Conductive Coating |
| --- | --- | --- | --- |
| Example 19 | 206 | $7.5 \times 10^{-5}$ | Yes |
| Example 3B | 175 + 25 | $>1 \times 10^7$ | No |
| Example 3C | 175 + 25 | $>1 \times 10^7$ | No |
| Example 3D | 175 + 25 | $>1 \times 10^7$ | No |
| Example 3E | 175 + 25 | $>1 \times 10^7$ | No |

The coating compositions of the present invention can further include other additives and functional ingredients known in the art including waxes, pH modifiers, colorants, solvents, surfactants and other components typically used in dry in place corrosion coating compositions.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An anti-corrosion coating composition for a metal substrate comprising: no electrically conductive polymers and at least one non-electrically conductive film forming copolymer; a nitrogen containing functional group X, said group X comprising a pyridine, a dihydropyridine, a pyrrole, an imidazole, or mixtures thereof and wherein a positive amount to 100% of said functional group X is bound to said copolymer and crosslinks chains of said copolymer; and a metallate anion, said metallate anion capable of binding to a nitrogen in said functional group X by ion pairing.

2. A coating composition as recited in claim 1, wherein a positive amount of said functional group X is free and not bound to said copolymer in said coating composition.

3. A coating composition as recited in claim 1, wherein said functional group X is present in an amount of from 0.001 to 0.5 moles of said functional group X per kilogram of dried coating composition.

4. A coating composition as recited in claim 1, wherein said metallate anion is present in an amount of from 0.001 to 1.5 moles of said metallate anion per kilogram of dried coating composition.

5. A coating composition as recited in claim 1, wherein said anion comprises a metallate of molybdenum, tungsten, vanadium, zirconium, chromium, or mixtures thereof.

6. A coating composition as recited in claim 4, wherein the source of said metallate anion comprises ammonium heptamolybdate, tungstic acid, a salt of tungstic acid, vanadium pentaoxide, ammonium vanadate, vanadyl sulfate, fluorozirconic acid, a salt of fluorozirconic acid, chromium trioxide, or mixtures thereof.

7. An anti-corrosion coating composition for a metal substrate comprising: no electrically conductive polymers and at least one non-electrically conductive film forming copolymer; a nitrogen containing functional group X, said group X comprising a pyridine, a dihydropyridine, a pyrrole, an imidazole, or mixtures thereof; and a metallate anion, said metallate anion capable of binding to a nitrogen in said functional group X by ion pairing, wherein said functional group X comprises a dihydropyridine having the formula (I)

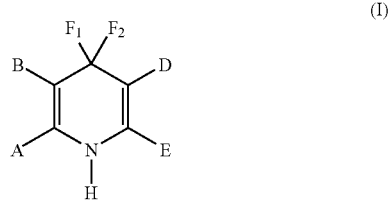

(I)

wherein A and E are independently $C_1$ to $C_4$ alkyl groups; B and D are independently $COOR_1$, wherein $R_1$ is a linear or branched $C_1$ to $C_{12}$ hydrocarbon, or a polymer chain; $F_1$ is hydrogen; and $F_2$ is L derived from an aldehyde LCHO.

8. A coating composition as recited in claim 1, wherein said functional group X comprises a pyridine having the formula (II)

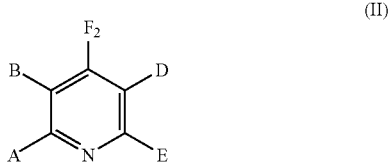

(II)

wherein A and E are independently hydrogen, $C_1$ to $C_4$ alkyl groups, or a polymer chain; B and D are independently hydrogen, $COOR_1$, wherein $R_1$ is a linear or branched chain $C_1$ to $C_{12}$ hydrocarbon, or a polymer chain; and $F_2$ is L derived from an aldehyde LCHO or a polymer chain.

9. An anti-corrosion coating composition for a metal substrate comprising: no electrically conductive polymers and at least one non-electrically conductive film forming copolymer; a nitrogen containing functional group X, said group X comprising a pyridine, a dihydropyridine, a pyrrole, an imidazole, or mixtures thereof; and a metallate anion, said metallate anion capable of binding to a nitrogen in said functional group X by ion pairing, wherein said functional group X comprises a pyrrole having formula (III)

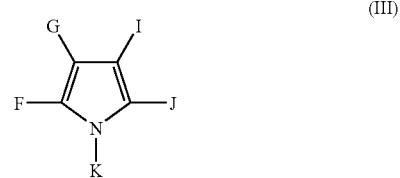

(III)

wherein I is hydrogen, $R_1$, or $COOR_1$, where $R_1$ is a linear or branched $C_1$ to $C_{12}$ hydrocarbon, or a polymer chain; J is a $C_1$ to $C_4$ alkyl; K is hydrogen or a polymer chain; F is hydrogen, a $C_1$ to $C_{12}$ linear or branched hydrocarbon or $COOR_1$, wherein $R_1$ is a linear or branched $C_1$ to $C_{12}$ hydrocarbon; and G is hydrogen, a $C_1$ to $C_{12}$ linear or branched hydrocarbon, or a polymer chain.

10. A coating composition as recited in claim 1, wherein said functional group X comprises an imidazole having formula (IV)

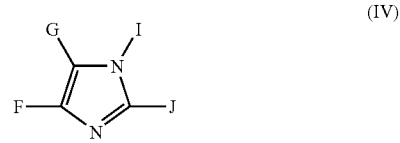

(IV)

wherein I is a polymer chain, hydrogen or a $C_1$ to $C_{12}$ linear or branched hydrocarbon; J is hydrogen or L derived from an aldehyde L-CHO, F and G are independently hydrogen or a $C_1$ to $C_{12}$ linear or branched hydrocarbon.

11. An anti-corrosion coating composition for a metal substrate comprising: no electrically conductive polymers and at least one non-electrically conductive film forming copolymer; a nitrogen containing functional group X, said group X comprising a pyridine, a dihydropyridine, a pyrrole, an imidazole, or mixtures thereof; and a metallate anion, said metallate anion capable of binding to a nitrogen in said functional group X by ion pairing, wherein said copolymer comprises beta-keto ester groups and said functional group X comprises a dihydropyridine group formed by reacting two equivalents of said copolymer beta-keto ester groups with one equivalent of ammonia and one equivalent of an aldehyde via a Hantzsch dihydropyridine synthesis reaction.

12. An anti-corrosion coating composition for a metal substrate comprising: no electrically conductive polymers and at least one non-electrically conductive film forming copolymer; a nitrogen containing functional group X, said group X comprising a pyridine, a dihydropyridine, a pyrrole, an imidazole, or mixtures thereof; and a metallate anion, said metallate anion capable of binding to a nitrogen in said functional group X by ion pairing, wherein said copolymer comprises beta-keto ester groups and said functional group X comprises a pyrrole group formed by reacting one equivalent of said copolymer beta-keto ester with one equivalent of an alpha-amino ketone via a Knorr pyrrole synthesis reaction.

13. An anti-corrosion coating composition for a metal substrate comprising: no electrically conductive polymers and at least one non-electrically conductive film forming copolymer; a nitrogen containing functional group X, said group X comprising a pyridine, a dihydropyridine, a pyrrole, an imidazole, or mixtures thereof; and a metallate anion, said metallate anion capable of binding to a nitrogen in said functional group X by ion pairing, wherein said copolymer comprises at least one of a 1,4-dicarbonyl group, a primary amine group or a mixture thereof and said functional group X comprises a pyrrole formed via a Paal-Knorr Synthesis reaction.

14. An anti-corrosion coating composition for a metal substrate comprising: no electrically conductive polymers and at least one non-electrically conductive film forming copolymer; a nitrogen containing functional group X, said group X comprising a pyridine, a dihydropyridine, a pyrrole, an imidazole, or mixtures thereof; and a metallate anion, said metallate anion capable of binding to a nitrogen in said functional group X by ion pairing, wherein said copolymer comprises at least one of a substituted 1,2-dicarbonyl group, a primary amine group, or a mixture thereof and functional group X comprises an imidazole formed by an adaptation of a Debus-Radziszewski imidazole synthesis.

15. A coating composition as recited in claim 1, wherein said nitrogen of said functional group X has a pKa of from 4 to 11.

16. An anti-corrosion coating composition as recited in claim 7, wherein a positive amount to 100% of said functional group X is bound to said copolymer.

17. An anti-corrosion coating composition as recited in claim 7, wherein a positive amount to 100% of said functional group X is bound to said copolymer and crosslinks chains of said copolymer.

18. An anti-corrosion coating composition as recited in claim 7, wherein a positive amount to 100% of said functional group X is free and not bound to said copolymer in said coating composition.

19. An anti-corrosion coating composition as recited in claim 7, wherein said functional group X is present in an amount of from 0.001 to 0.5 moles of said functional group X per kilogram of dried coating composition.

20. An anti-corrosion coating composition as recited in claim 7, wherein said metallate anion is present in an amount of from 0.001 to 1.5 moles of said metallate anion per kilogram of dried coating composition.

21. An anti-corrosion coating composition as recited in claim 7, wherein said anion comprises a metallate of molybdenum, tungsten, vanadium, zirconium, chromium, or mixtures thereof.

22. An anti-corrosion coating composition as recited in claim 7, wherein said functional group X further comprises a pyridine having the formula (II)

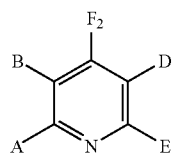

(II)

wherein A and E are independently hydrogen, $C_1$ to $C_4$ alkyl groups, or a polymer chain; B and D are independently hydrogen, $COOR_1$, wherein $R_1$ is a linear or branched chain $C_1$ to $C_{12}$ hydrocarbon, or a polymer chain; and $F_2$ is L derived from an aldehyde LCHO or a polymer chain.

23. An anti-corrosion coating composition as recited in claim 7, wherein said functional group X further comprises an imidazole having formula (IV)

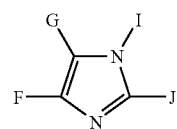

(IV)

wherein I is a polymer chain, hydrogen or a $C_1$ to $C_{12}$ linear or branched hydrocarbon; J is hydrogen or L derived from an aldehyde L-CHO, F and G are independently hydrogen or a $C_1$ to $C_{12}$ linear or branched hydrocarbon.

24. An anti-corrosion coating composition as recited in claim 9, wherein a positive amount to 100% of said functional group X is bound to said copolymer.

25. An anti-corrosion coating composition as recited in claim 9, wherein a positive amount to 100% of said functional group X is bound to said copolymer and crosslinks chains of said copolymer.

26. An anti-corrosion coating composition as recited in claim 9, wherein a positive amount to 100% of said functional group X is free and not bound to said copolymer in said coating composition.

27. An anti-corrosion coating composition as recited in claim 9, wherein said functional group X is present in an amount of from 0.001 to 0.5 moles of said functional group X per kilogram of dried coating composition.

28. An anti-corrosion coating composition as recited in claim 9, wherein said metallate anion is present in an amount of from 0.001 to 1.5 moles of said metallate anion per kilogram of dried coating composition.

29. An anti-corrosion coating composition as recited in claim 9, wherein said anion comprises a metallate of molybdenum, tungsten, vanadium, zirconium, chromium, or mixtures thereof.

30. An anti-corrosion coating composition as recited in claim 9, wherein said functional group X further comprises a pyridine having the formula (II)

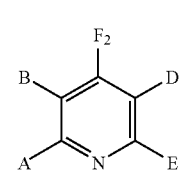

(II)

wherein A and E are independently hydrogen, $C_1$ to $C_4$ alkyl groups, or a polymer chain; B and D are independently hydrogen, $COOR_1$, wherein $R_1$ is a linear or branched chain $C_1$ to $C_{12}$ hydrocarbon, or a polymer chain; and $F_2$ is L derived from an aldehyde LCHO or a polymer chain.

31. An anti-corrosion coating composition as recited in claim 9, wherein said functional group X further comprises an imidazole having formula (IV)

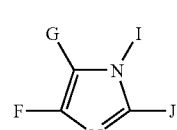

(IV)

wherein I is a polymer chain, hydrogen or a $C_1$ to $C_{12}$ linear or branched hydrocarbon; J is hydrogen or L derived from an aldehyde L-CHO, F and G are independently hydrogen or a $C_1$ to $C_{12}$ linear or branched hydrocarbon.

32. An anti-corrosion coating composition as recited in claim 11, wherein a positive amount to 100% of said functional group X is bound to said copolymer and crosslinks chains of said copolymer.

33. An anti-corrosion coating composition as recited in claim 11, wherein a positive amount to 100% of said functional group X is free and not bound to said copolymer in said coating composition.

34. An anti-corrosion coating composition as recited in claim 11, wherein said functional group X is present in an amount of from 0.001 to 0.5 moles of said functional group X per kilogram of dried coating composition.

35. An anti-corrosion coating composition as recited in claim 11, wherein said metallate anion is present in an amount of from 0.001 to 1.5 moles of said metallate anion per kilogram of dried coating composition.

36. An anti-corrosion coating composition as recited in claim 11, wherein said anion comprises a metallate of molybdenum, tungsten, vanadium, zirconium, chromium, or mixtures thereof.

37. An anti-corrosion coating composition as recited in claim 11, wherein said functional group X further comprises a pyridine having the formula (II)

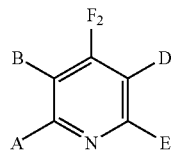

(II)

wherein A and E are independently hydrogen, $C_1$ to $C_4$ alkyl groups, or a polymer chain; B and D are independently hydrogen, $COOR_1$, wherein $R_1$ is a linear or branched chain $C_1$ to $C_{12}$ hydrocarbon, or a polymer chain; and $F_2$ is L derived from an aldehyde LCHO or a polymer chain.

38. An anti-corrosion coating composition as recited in claim 11, wherein said functional group X further comprises an imidazole having formula (IV)

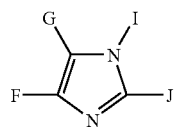

(IV)

wherein I is a polymer chain, hydrogen or a $C_1$ to $C_{12}$ linear or branched hydrocarbon; J is hydrogen or L derived from an aldehyde L-CHO, F and G are independently hydrogen or a $C_1$ to $C_{12}$ linear or branched hydrocarbon.

39. An anti-corrosion coating composition as recited in claim 12, wherein a positive amount to 100% of said functional group X is bound to said copolymer and crosslinks chains of said copolymer.

40. An anti-corrosion coating composition as recited in claim 12, wherein a positive amount to 100% of said functional group X is free and not bound to said copolymer in said coating composition.

41. An anti-corrosion coating composition as recited in claim 12, wherein said functional group X is present in an amount of from 0.001 to 0.5 moles of said functional group X per kilogram of dried coating composition.

42. An anti-corrosion coating composition as recited in claim 12, wherein said metallate anion is present in an amount of from 0.001 to 1.5 moles of said metallate anion per kilogram of dried coating composition.

43. An anti-corrosion coating composition as recited in claim 12, wherein said anion comprises a metallate of molybdenum, tungsten, vanadium, zirconium, chromium, or mixtures thereof.

44. An anti-corrosion coating composition as recited in claim 12, wherein said functional group X further comprises a pyridine having the formula (II)

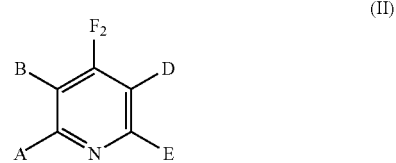

(II)

wherein A and E are independently hydrogen, $C_1$ to $C_4$ alkyl groups, or a polymer chain; B and D are independently hydrogen, $COOR_1$, wherein $R_1$ is a linear or branched chain $C_1$ to $C_{12}$ hydrocarbon, or a polymer chain; and $F_2$ is L derived from an aldehyde LCHO or a polymer chain.

45. An anti-corrosion coating composition as recited in claim 12, wherein said functional group X further comprises an imidazole having formula (IV)

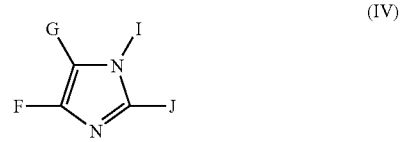

(IV)

wherein I is a polymer chain, hydrogen or a $C_1$ to $C_{12}$ linear or branched hydrocarbon; J is hydrogen or L derived from an aldehyde L-CHO, F and G are independently hydrogen or a $C_1$ to $C_{12}$ linear or branched hydrocarbon.

46. An anti-corrosion coating composition as recited in claim 13, wherein a positive amount to 100% of said functional group X is bound to said copolymer and crosslinks chains of said copolymer.

47. An anti-corrosion coating composition as recited in claim 13, wherein a positive amount to 100% of said functional group X is free and not bound to said copolymer in said coating composition.

48. An anti-corrosion coating composition as recited in claim 13, wherein said functional group X is present in an amount of from 0.001 to 0.5 moles of said functional group X per kilogram of dried coating composition.

49. An anti-corrosion coating composition as recited in claim 13, wherein said metallate anion is present in an amount of from 0.001 to 1.5 moles of said metallate anion per kilogram of dried coating composition.

50. An anti-corrosion coating composition as recited in claim 13, wherein said anion comprises a metallate of molybdenum, tungsten, vanadium, zirconium, chromium, or mixtures thereof.

51. An anti-corrosion coating composition as recited in claim 13, wherein said functional group X further comprises a pyridine having the formula (II)

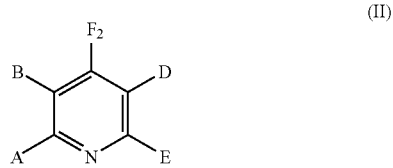

(II)

wherein A and E are independently hydrogen, $C_1$ to $C_4$ alkyl groups, or a polymer chain; B and D are independently hydrogen, $COOR_1$, wherein $R_1$ is a linear or branched chain $C_1$ to $C_{12}$ hydrocarbon, or a polymer chain; and $F_2$ is L derived from an aldehyde LCHO or a polymer chain.

52. An anti-corrosion coating composition as recited in claim 13, wherein said functional group X further comprises an imidazole having formula (IV)

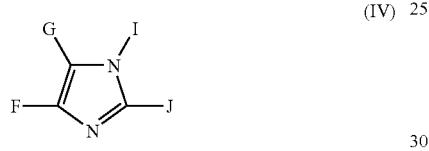

(IV)

wherein I is a polymer chain, hydrogen or a $C_1$ to $C_{12}$ linear or branched hydrocarbon; J is hydrogen or L derived from an aldehyde L-CHO, F and G are independently hydrogen or a $C_1$ to $C_{12}$ linear or branched hydrocarbon.

53. An anti-corrosion coating composition as recited in claim 14, wherein a positive amount to 100% of said functional group X is bound to said copolymer and crosslinks chains of said copolymer.

54. An anti-corrosion coating composition as recited in claim 14, wherein a positive amount to 100% of said functional group X is free and not bound to said copolymer in said coating composition.

55. An anti-corrosion coating composition as recited in claim 14, wherein said functional group X is present in an amount of from 0.001 to 0.5 moles of said functional group X per kilogram of dried coating composition.

56. An anti-corrosion coating composition as recited in claim 14, wherein said metallate anion is present in an amount of from 0.001 to 1.5 moles of said metallate anion per kilogram of dried coating composition.

57. An anti-corrosion coating composition as recited in claim 14, wherein said anion comprises a metallate of molybdenum, tungsten, vanadium, zirconium, chromium, or mixtures thereof.

58. An anti-corrosion coating composition as recited in claim 14, wherein said functional group X further comprises a pyridine having the formula (II)

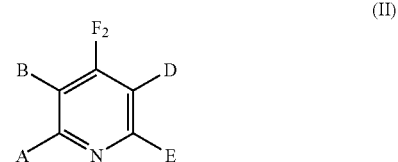

(II)

wherein A and E are independently hydrogen, $C_1$ to $C_4$ alkyl groups, or a polymer chain; B and D are independently hydrogen, $COOR_1$, wherein $R_1$ is a linear or branched chain $C_1$ to $C_{12}$ hydrocarbon, or a polymer chain; and $F_2$ is L derived from an aldehyde LCHO or a polymer chain.

59. An anti-corrosion coating composition as recited in claim 14, wherein said functional group X further comprises an imidazole having formula (IV)

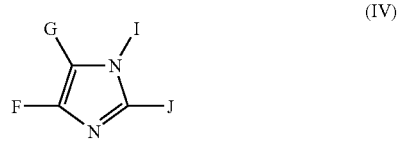

(IV)

wherein I is a polymer chain, hydrogen or a $C_1$ to $C_{12}$ linear or branched hydrocarbon; J is hydrogen or L derived from an aldehyde L-CHO, F and G are independently hydrogen or a $C_1$ to $C_{12}$ linear or branched hydrocarbon.

* * * * *